Figure 1:
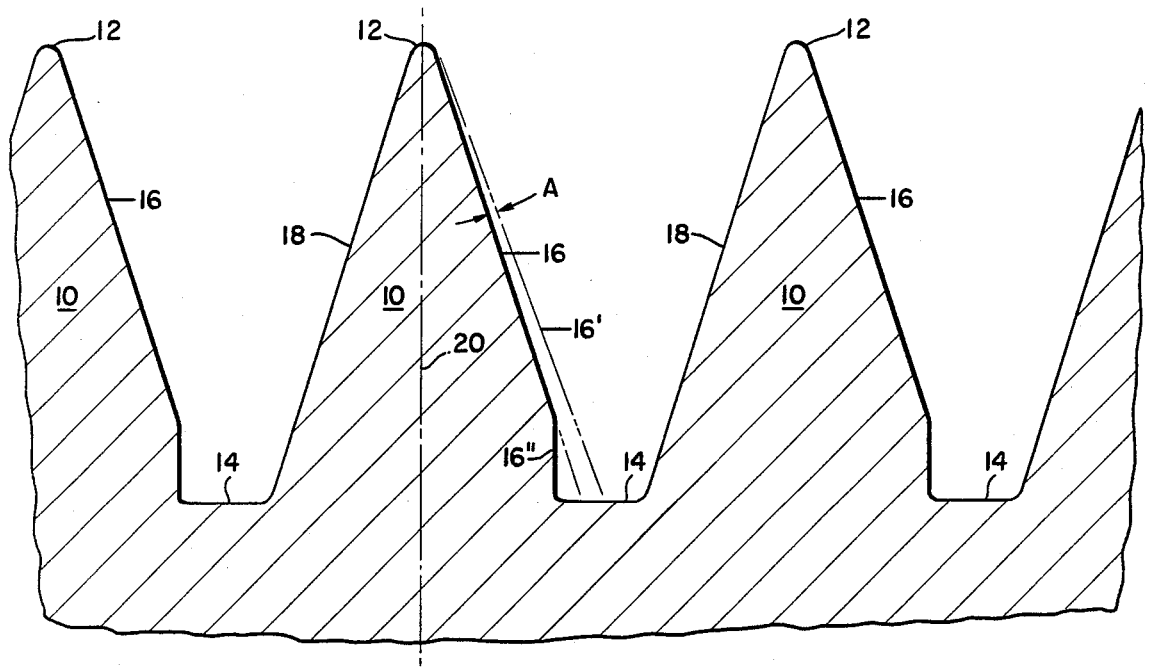

United States Patent [19]

Leonard, Jr.

[11] Patent Number: 4,752,164

[45] Date of Patent: Jun. 21, 1988

[54] THREAD CUTTING TOOLS

[75] Inventor: John E. Leonard, Jr., Fayetteville, Pa.

[73] Assignee: Teledyne Industries, Inc., Los Angeles, Calif.

[21] Appl. No.: 940,805

[22] Filed: Dec. 12, 1986

[51] Int. Cl.$^4$ .............................................. B23G 5/04
[52] U.S. Cl. ...................................... 408/221; 10/120; 408/218
[58] Field of Search ........ 10/120, 120.5 R, 120.5 AD, 10/121; 408/215-221

[56] References Cited

U.S. PATENT DOCUMENTS 1,007,317  10/1911  Wells .................................. 408/218
2,757,392  8/1956  Petersen ............................... 408/218

Primary Examiner—Gil Weidenfeld
Assistant Examiner—Steven C. Bishop
Attorney, Agent, or Firm—Nies, Webner, Kurz & Bergert

[57] ABSTRACT

Chaser for cutting threads on a work piece, the chaser having thread cutting formations with crests and roots, one flank of each of said formations being relieved at a first angle from the region of the crest toward the root and being relieved at a greater angle in the region adjacent the root of the formation. The chasers may be provided in sets with odd numbered chasers being mirror images of the even numbered chasers.

8 Claims, 1 Drawing Sheet

THREAD CUTTING TOOLS

This invention relates to tools for cutting threads in a work piece, such tools commonly being referring to as chasers.

In one form the chasers are of the general type shown in U.S. Pat. No. 2,239,735 and are mounted in a head in the general fashion shown in that patent. Such chasers are often used in sets and have been used to cut a variety of types of threads on a wide variety of work pieces made of ferrous and non-ferrous materials.

Such tools and the associated heads and work handling apparatus have been used with success over the years. However, problems have been encountered in producing threads, particularly pipe threads, on very soft or otherwise marginally machinable materials which are coming into increasingly widespread use because of their relatively low cost. In many cases long stringy chips form which cause tearing of the thread crests and prvent the attainment of the desired thread finish.

It has been found that, particularly with NPT threads which have sharp thread crests, the action between the cutting tools and the work piece creates a pinching action which causes tearing of both the flanks and the crest. It has been proposed to remedy these and similar problems by repositioning of the tools to create a rubbing or burnishing condition. However, this leads to heat build up and reduces the life of the chasers.

It has also been proposed to relieve one flank on each of the thread forming ridges on the chasers. In the past such chasers have been used in sets. When so used, they are alternated, with the odd numbered chasers for example having relief on the front flank and the even numbered chasers having relief on the rear flank. This has partially alleviated the problem and to a certain extent has reduced the incidences of tearing the threads on the work piece. However this expedient has been at best a partial solution to the problems and very soft stringy material continues to produce an unacceptable amount of tearing and an objectionably rough finish.

With the foregoing considerations in mind it is the principal purpose and object of the present invention to provide improved chasers which may be used individually or in sets which include uniquely modified thread cutting formations which permit the formation of threads even on work pieces made of marginally machinable material, without adverse tearing of the flanks or crests and with a finish which meets all service requirements.

It is a further object of the present invention to provide improved chasers which permit the cutting of threads on a work piece with reduced power input, reduced heat generation and which facilitates the ingress of thread cutting lube or coolant to the tool-work piece interface.

It is also an object of the present invention to provide improved chasers which may be produced at a cost which is essentially the same as the cost of producing conventional chasers.

Figure 2:
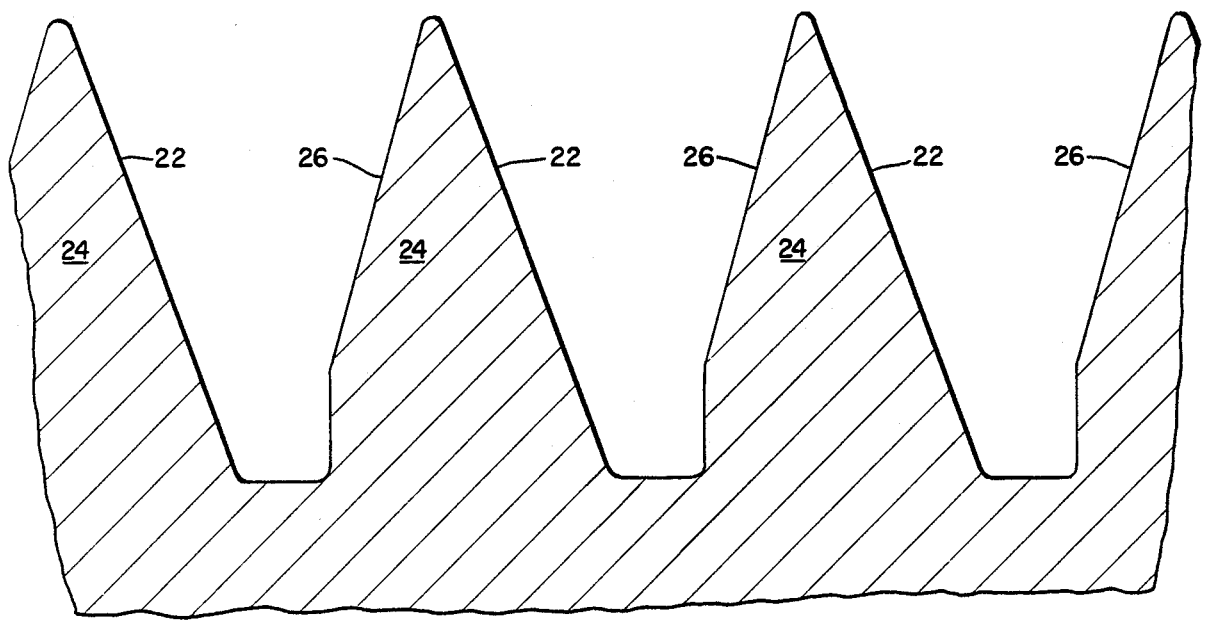

Additional objects and advantages will become apparent as the description proceeds in connection with the accompanying drawings in which:

FIG. 1 is a fragmentary section on substantially enlarged scale illustrating the profile of the thread cutting formations on the chasers of the present invention, the practices of the prior art being shown in phantom lines; and FIG. 2 is a similar view of an alternate chaser formed as a mirror image of the chaser shown in FIG. 1 for use in conjunction with the chaser of FIG. 1.

Referring now more particularly to the drawings, the chasers of the present invention are provided with a number, typically 8 or 10 identical thread formations or ridges 10 having crests 12 and being spaced from adjacent ridges by roots 14. The front and back flanks of the thread forming ridges are indicated respectively at 16 and 18. Typically, the depth of the formations 10 range from 0.025" to 0.10" and the spacing between adjacent crests 12 ranges from 0.040" to 0.125". Conventionally the thread ridges are formed symetrically about an axis 20 which is normal to the helix axis of the work piece, the thread formations thus being mirror images of the threads to be produced on the work piece. The profile of the back flank 18 of the chaser of FIG. 1 is so formed in accordance with conventional practice. The front flank however, has a unique profile 16. The profile of the conventionally formed front flank is illustrated in phantom lines at 16'.

In a typical case the angle of relief, angle A, between the modified flank 16 and the conventionally formed flank 16' is from 0° 10" to 3°.

It is believed that a similar modification of the flank angle has been proposed in the past, although the magnitude of the modification is not known. However, it has been found that this modification alone, that is, the change in angle from the normal profile 16' to the relieved profile 16 does not solve the problem of damage to the roots, crests and flanks of threads formed on very soft or stringy material particularly on threads with sharp crests. It has been discovered that these problems can be alleviated substantially or eliminated altogether by a further modification of the profile.

In accordance with the present invention the flank 16' is further relieved in the root area by providing a surface 16" which preferably is essentially parallel to the axis 20 which effectively and asymmetrically widens the root 14. The disposition of the surface 16" is such that the width of the root 14 is 1.5 to 3 times the width of the root in a conventionally formed chaser.

The extent of the modification of both the major portion of the flank and the further modification of the profile of the root area are determined by the type of thread being formed and the nature of the material from which the work piece is made, the maximum modifications being effective with the sofest materials and the most difficult to form threads.

The chaser of FIG. 2 is a mirror image of the chaser of FIG. 1. The front flanks 22 of the thread forming ridges 24 are of conventional unmodified form and the back flanks 26 are modified in the same manner as the front flanks 16 of the chaser of FIG. 1.

The chaser having an alternating combination configuration of that shown in FIG. 1 and FIG. 2 may be used singly for lathe type threading. However, more frequently the chasers are used in sets, as shown for example in U.S. Pat. No. 2,239,735. Where two or more chasers are used they are alternated, the odd numbered chasers being of the form shown in FIG. 1 and the even numbered chasers being the form shown in FIG. 2.

During the threading process the reliefs described above act to confine the cutting action of alternate chasers essentially to the opposite side of the associated form to provide the improved performance noted above, particularly improvement in the surface and form finish.

Because of the modification in the thread form, the chasers essentially machine one flank of the thread on a work piece at a time and thus avoid the lifting and tearing action the work piece thread crest inherent in conventional tools. The channel chip which causes tearing of the thread crest is eliminated by the relief. Also, the alternating relief provides a roughing and finishing action to occur thereby providing an improved finish. The relief also permits coolant to disperse through the portion of the tool which produces heat build-up, improved lubrication and contributes to the cleansing of chips and abrasive particles which otherwise would contribute to tool break down.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A chaser for cutting threads on a work piece, said chaser having a plurality of thread cutting ridges having crests and roots, one flank of each of said ridges being a mirror image of the thread to be produced on the work piece and the opposite flank of each of said ridges being relieved on a first angle along a substantial portion of its length from the crest toward the root and being relieved at a greater angle adjacent the root thereof.

2. The chaser according to claim 1 wherein said first angle is from 0 degrees 10 minutes to 3 degrees.

3. The chaser according to claim 1 wherein the relief provided on said one flank effectively increases the width of the root from substantially 1.5 times to substantially three times the width of the root in a conventionally formed chaser.

4. The chaser according to claim 3 wherein said first angle is from 0 degrees 10 minutes to 3 degrees.

5. A set of two groups of chasers for cutting threads on a work piece, said chasers each having a plurality of thread cutting ridges having crests and roots and front and back flanks, said back flanks of each of said ridges on one group of chasers being a mirror image of the thread to be produced on the work piece and the front flanks of each of said ridges on said one group of chasers being relieved at a first angle from a point adjacent a crest of said ridges toward said root and being relieved at a greater angle adjacent the root thereof, and the front flanks of each of the ridges on the other group of chasers being a mirror image of the thread to be produced on the work piece and the back flanks of the ridges on said other group of chasers being relieved at said first angle from a point adjacent the crest thereof toward the root thereof and being relieved at said greater angle adjacent the root thereof.

6. The chaser set according to claim 5 wherein said first angle is from 0 degrees 10 minutes to 3 degrees.

7. The chaser set according to claim 5 wherein the relief provided on said flanks effectively increases the width of the root from substantially 1.5 to substantially three times the width of the root in a conventionally formed chaser.

8. The chaser according to claim 7 wherein said first angle is from 0 degrees 10 minutes to 3 degrees.

* * * * *